US012728647B2

(12) United States Patent
Nakakubo et al.

(10) Patent No.: US 12,728,647 B2
(45) Date of Patent: Sep. 8, 2026

(54) THERMAL PRINT HEAD

(71) Applicant: ROHM CO., LTD., Kyoto (JP)

(72) Inventors: Kazuya Nakakubo, Kyoto (JP); Yasuyuki Aritaki, Kyoto (JP); Shinya Tanaka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 120 days.

(21) Appl. No.: 18/774,544

(22) Filed: Jul. 16, 2024

(65) Prior Publication Data

US 2025/0033377 A1 Jan. 30, 2025

(30) Foreign Application Priority Data

Jul. 27, 2023 (JP) ................................ 2023-122153

(51) Int. Cl.
*B41J 2/335* (2006.01)

(52) U.S. Cl.
CPC ........... *B41J 2/3354* (2013.01); *B41J 2/3351* (2013.01); *B41J 2/33515* (2013.01)

(58) Field of Classification Search
CPC .... B41J 2/3354; B41J 2/3351; B41J 2/33515; B41J 2/33525; B41J 2/3353; B41J 2/33545; B41J 2/3357; B41J 2/3359; B41J 2/33505; B41J 2/335; B41J 2/33595; B41J 2/345
See application file for complete search history.

(56) References Cited

U.S. PATENT DOCUMENTS

2019/0100027 A1* 4/2019 Matsusaki .............. B41J 2/3357
2022/0032649 A1* 2/2022 Abe ....................... B41J 2/3357
2023/0150273 A1* 5/2023 Yamashita ............. B41J 2/3358
347/208

FOREIGN PATENT DOCUMENTS

JP 2019098667 A 6/2019

* cited by examiner

*Primary Examiner* — Kristal Feggins
(74) *Attorney, Agent, or Firm* — HSML P.C.

(57) ABSTRACT

The present disclosure provides a thermal print head. The thermal print head includes: a heat resistor, a first electrode and a second electrode. The first electrode includes a base portion and an extension portion. The extension portion includes a first strip portion and a second strip portion. A first width of the first strip portion is less than a second width of the base portion at a conjunction between the second strip portion and the base portion. A third width of the second strip portion at the conjunction between the second strip portion and the base portion is less than the second width. A width of at least a portion of the second strip portion is equal to or less than the first width. A length of the second strip portion is greater than a half of a difference between a length of the first strip portion and a width of the heat resistor.

12 Claims, 7 Drawing Sheets

THERMAL PRINT HEAD

TECHNICAL FIELD

The present disclosure relates to a thermal print head.

BACKGROUND

Japanese Patent Publication No. 2019-98667 discloses (patent document 1) discloses a thermal print head including an insulative substrate, a glaze layer laminated on the insulative substrate, an electrode disposed on the glaze layer, and a heat resistor including multiple heat portions. The electrode includes a common electrode and multiple individual electrodes. Each of the multiple heat portions is conducted with the common electrode and one of the multiple individual electrodes.

PRIOR ART DOCUMENT

Patent Publication

[Patent document 1] Japan Patent Publication No. 2019-98667

DETAILED DESCRIPTION OF THE EMBODIMENTS

The embodiments of the present disclosure are described in detail with reference to the accompanying drawings below. Moreover, the same or equivalent parts are denoted with the same or equivalent numerals or symbols, and description is not repeated. At least part of the configurations of the embodiments described below can be combined as desired.

First Embodiment

Figure 1:
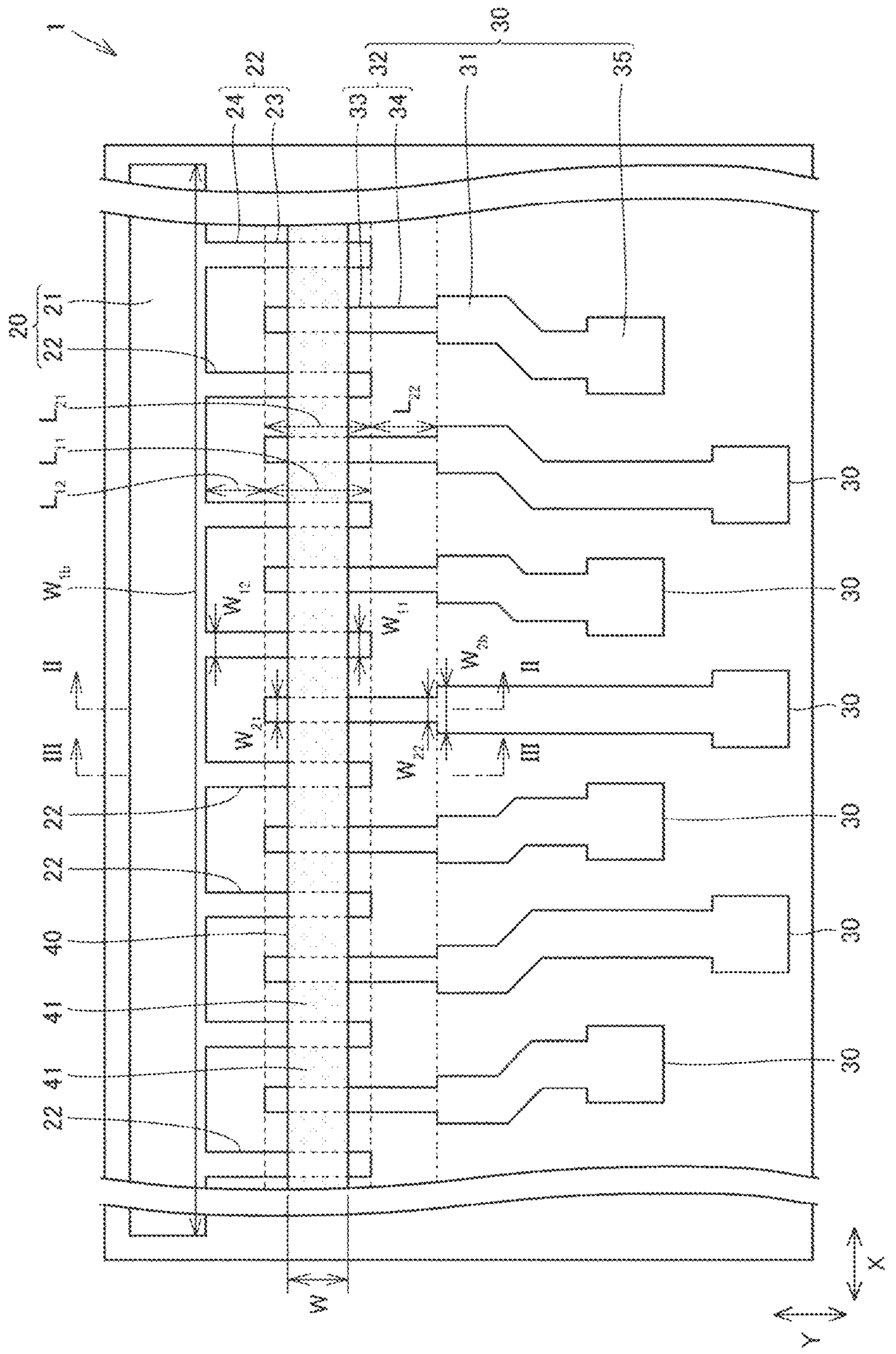
FIG. 1 is a schematic partial enlarged plan view of a thermal print head according to a first embodiment.
Figure 2:
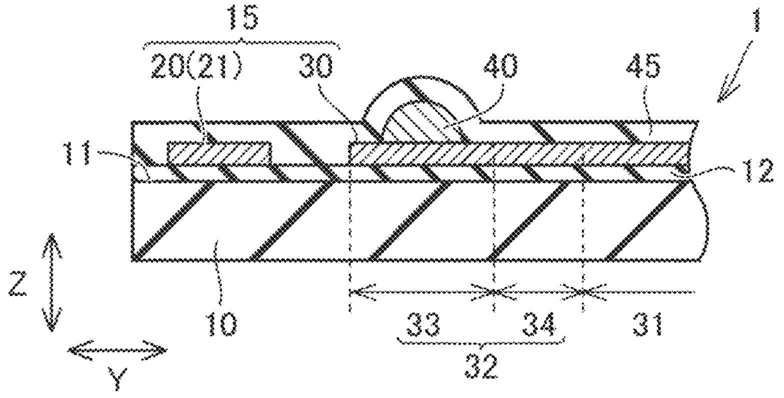
FIG. 2 is a schematic partial enlarged cross-sectional diagram of the thermal print head along the section line II-II in FIG. 1 according to the first embodiment.
Figure 3:
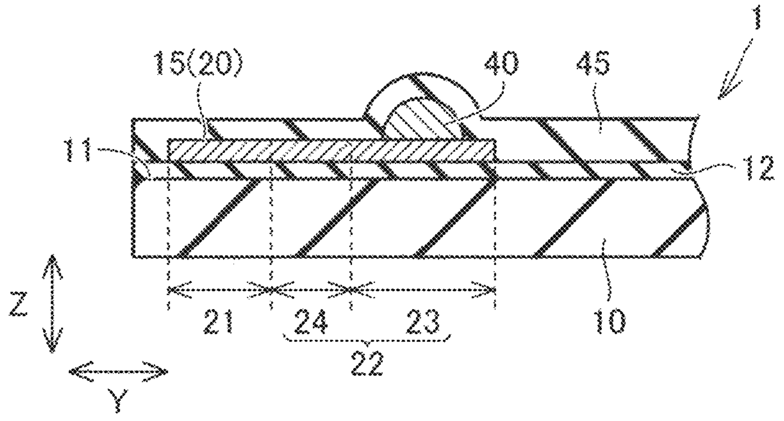
FIG. 3 is a schematic partial enlarged cross-sectional diagram of the thermal print head along the section line III-III in FIG. 1 according to the first embodiment.

Referring to FIG. 1 to FIG. 3, a thermal print head 1 according to a first embodiment is described below. The thermal print head 1 includes a substrate 10, a glaze layer 12, a wiring layer 15, a heat resistor 40 and a protection layer 45.

The substrate 10 has a main surface 11. A lengthwise direction of the substrate 10 in a plan view of the main surface 11 is set as an X direction. The X direction is a main scan direction. A widthwise direction of the substrate 10 in the plan view of the main surface 11 is set as a Y direction. The Y direction is a secondary scan direction. A thickness direction of the substrate 10 perpendicular to the X direction and the Y direction is set as a Z direction. The main surface 11 is an end surface in the thickness direction (the Z direction) of the substrate 10. The substrate 10 is formed of an insulative material such as aluminum oxide ($Al_2O_3$). The substrate 10 is formed of, for example, ceramic.

The glaze layer 12 can be disposed on the main surface 11 of the substrate 10. The glaze layer 12 can store heat generated by the heat resistor 40. The glaze layer 12 can be formed of an insulative material such as glass.

The wiring layer 15 is disposed on the glaze layer 12. The wiring layer 15 is formed of a conductive material such as silver (Ag) or gold (Au). The wiring layer 15 includes a common electrode 20 and multiple individual electrodes 30. The common electrode 20 and the multiple individual electrodes 30 are connected to the heat resistor 40.

More specifically, the common electrode 20 includes a base portion 21 and multiple extension portions 22. The base portion 21 extends along the X direction, and a lengthwise direction of the base portion 21 is the X direction. The base portion 21 is separated from the heat resistor 40 in the Y direction. The multiple extension portions 22 individually extend from a side of the base portion 21 opposite to the heat resistor 40 toward the heat resistor 40. A lengthwise direction of each of the multiple extension portions 22 is, for example, the Y direction. The multiple extension portions 22 are arranged at intervals along the X direction.

Each of the multiple extension portions 22 includes a first strip portion 23 and a second strip portion 24. The first strip portion 23 is in contact with the heat resistor 40. The first strip portion 23 does not overlap the individual electrode 30 (more specifically, the first strip portion 33) in the lengthwise direction (the X direction) of the heat resistor 40. That is to say, the first strip portion 23 is located within a region which is obtained by extending a first strip portion 33 adjacent to the first strip portion 23 along the lengthwise direction of the heat resistor 40. The second strip portion 24 is connected to the first strip portion 23 and the base portion 21. The second strip portion 24 does not overlap the individual electrode 30 (more specifically, the first strip portion 33) in the lengthwise direction of the heat resistor 40. That is to say, the second strip portion 24 is located outside the region which is obtained by extending the first strip portion 33 adjacent to the first strip portion 23 along the lengthwise direction of the heat resistor 40. A thickness of the second strip portion 24 is equal to a thickness of the base portion 21. The thickness of the second strip portion 24 can also be equal to a thickness of the first strip portion 23.

A width $W_{11}$ of the first strip portion 23 is less than a width $W_{1b}$ of the base portion 21 at a conjunction between the second strip portion 24 and the base portion 21. A width $W_{12}$ of the second strip portion 24 at the conjunction between the second strip portion 24 and the base portion 21 is less than the width $W_{1b}$ of the base portion 21 at the conjunction between the second strip portion 24 and the base portion 21. A width (for example, $W_{12}$) of at least a portion of the second strip portion 24 is equal to the width $W_{11}$ of the first strip portion 23. In this embodiment, the second strip portion 24 in its entirety has a certain width $W_{12}$ in the lengthwise direction of the extension portion 22, and the width $W_{12}$ of the second strip portion 24 in its entirety is equal to the width $W_{11}$ of the first strip portion 23.

In the present specification, the width $W_{11}$ of the first strip portion 23 refers to a length of the first strip portion 23 in a widthwise direction (the X direction) of the extension portion 22 in the plan view of the main surface 11 of the substrate 10. The width $W_{1b}$ of the base portion 21 at the conjunction between the second strip portion 24 and the base portion 21 refers to a length of the base portion 21 at the conjunction between the second strip portion 24 and the base portion 21 in a lengthwise direction (the X direction) of the heat resistor 40 in the plan view of the main surface 11 of the substrate 10. The width $W_{12}$ of the second strip portion 24 at the conjunction between the second strip portion 24 and the base portion 21 refers to a length of the second strip portion 24 at the conjunction between the second strip portion 24 and the base portion 21 in a widthwise direction (the X direction) of the extension portion 22 in the plan view of the main surface 11 of the substrate 10.

A length $L_{11}$ of the first strip portion 23 is set according to a configuration error of the heat resistor 40 when the thermal print head 1 is manufactured. The length $L_{11}$ of the first strip portion 23 is, for example, more than about 300 μm. A length $L_{12}$ of the second strip portion 24 is greater than a half of a difference between the length $L_{11}$ of the first strip portion 23 and a width W of the heat resistor 40. The length $L_{12}$ of the second strip portion 24 is, for example, more than about 150 μm. In the present specification, the length $L_{11}$ of the first strip portion 23 refers to a length of the first strip portion 23 in a lengthwise direction (the Y direction) of the extension portion 22 in the plan view of the main surface 11 of the substrate 10. The length $L_{12}$ of the second strip portion 24 refers to a length of the second strip portion 24 in a lengthwise direction (the Y direction) of the extension portion 22 in the plan view of the main surface 11 of the substrate 10. The width W of the heat resistor 40 refers to a length of the heat resistor 40 in a widthwise direction (the Y direction) of the heat resistor 40 in the plan view of the main surface 11 of the substrate 10.

The multiple individual electrodes 30 are arranged at intervals along the X direction. Each of the multiple individual electrodes 30 includes a base portion 31, an extension portion 32 and a pad 35. The base portion 31 is separated from the heat resistor 40 in the Y direction. The base portion 31 is connected to the extension portion 32 and the pad 35. The extension portion 32 extends from a proximal end of the base portion 31 close to the heat resistor 40 toward the heat resistor 40. A lengthwise direction of the extension portion 32 is, for example, the Y direction. The extension portion 32 is disposed between two adjacent extension portions 22. That is to say, the extension portion 22 and the extension portion 32 are arranged alternately in the X direction.

The extension portion 32 includes a first strip portion 33 and a second strip portion 34. The first strip portion 33 is in contact with the heat resistor 40. The first strip portion 33 overlaps the common electrode 20 (more specifically, the first strip portion 23) in the lengthwise direction (the X direction) of the heat resistor 40. That is to say, the first strip portion 33 is located within a region which is obtained by extending a first strip portion 23 adjacent to the first strip portion 33 along the lengthwise direction of the heat resistor 40. The second strip portion 34 is connected to the first strip portion 33 and the base portion 31. The second strip portion 34 does not overlap the common electrode 20 (more specifically, the first strip portion 23) in the lengthwise direction of the heat resistor 40. That is to say, the second strip portion 34 is located outside the region which is obtained by extending the first strip portion 23 adjacent to the first strip portion 33 along the lengthwise direction of the heat resistor 40. A thickness of the second strip portion 34 is equal to a thickness of the base portion 31. The thickness of the second strip portion 34 can also be equal to a thickness of the first strip portion 33.

A width $W_{21}$ of the first strip portion 33 is less than a width $W_{2b}$ of the base portion 31 at a conjunction between the second strip portion 34 and the base portion 31. A width $W_{22}$ of the second strip portion 34 at the conjunction between the second strip portion 34 and the base portion 31 is less than the width $W_{2b}$ of the base portion 31 at the conjunction between the second strip portion 34 and the base portion 31. A width (for example, $W_{22}$) of at least a portion of the second strip portion 34 is equal to the width $W_{21}$ of the first strip portion 33. In this embodiment, the second strip portion 34 in its entirety has a certain width $W_{22}$ in the lengthwise direction of the extension portion 32, and the width $W_{22}$ of the second strip portion 34 in its entirety is equal to the width $W_{21}$ of the first strip portion 33.

In the present specification, the width $W_{21}$ of the first strip portion 33 refers to a length of the first strip portion 33 in a widthwise direction (the X direction) of the extension portion 32 in the plan view of the main surface 11 of the substrate 10. The width $W_{2b}$ of the base portion 31 at the conjunction between the second strip portion 34 and the base portion 31 refers to a length of the base portion 31 at the conjunction between the second strip portion 34 and the base portion 31 in a lengthwise direction (the X direction) of the heat resistor 40 in the plan view of the main surface 11 of the substrate 10. The width $W_{22}$ of the second strip portion 34 at the conjunction between the second strip portion 34 and the base portion 31 refers to a length of the second strip portion 34 at the conjunction between the second strip portion 34 and the base portion 31 in a widthwise direction (the X direction) of the extension portion 32 in the plan view of the main surface 11 of the substrate 10.

A length $L_{21}$ of the first strip portion 33 is set according to a configuration error of the heat resistor 40 when the thermal print head 1 is manufactured. The length $L_{21}$ of the first strip portion 33 is equal to the length $L_{11}$ of the first strip portion 23. The length $L_{21}$ of the first strip portion 33 is, for example, more than about 300 μm. A length $L_{22}$ of the second strip portion 34 is greater than a half of a difference between the length $L_{21}$ of the first strip portion 33 and a width W of the heat resistor 40. The length $L_{22}$ of the second strip portion 34 is, for example, more than about 150 μm. In the present specification, the length $L_{21}$ of the first strip portion 33 refers to a length of the first strip portion 33 in a lengthwise direction (the Y direction) of the extension portion 32 in the plan view of the main surface 11 of the substrate 10. The length $L_{22}$ of the second strip portion 34 refers to a length of the second strip portion 34 in a lengthwise direction (the Y direction) of the extension portion 32 in the plan view of the main surface 11 of the substrate 10.

The pad 35 is connected to a distal end of the base portion 31 away from the heat resistor 40. A conductive wire (not shown) connected to a terminal of a driver integrated circuit (IC) is bonded to the pad 35.

In the plan view of the main surface 11 of the substrate 10, the heat resistor 40 is disposed between the base portion 21 of the common electrode 20 and the base portions 31 of the multiple individual electrodes 30. The heat resistor 40 extends along the X direction, and the lengthwise direction of the heat resistor 40 is the X direction. The heat resistor 40 is disposed on the first strip portions 23 and 33 and the glaze layer 12. In the plan view of the main surface 11 of the substrate 10, the heat resistor 40 overlaps the first strip portions 23 and 33. The heat resistor 40 is formed of a material (for example, ruthenium oxide) having a resistivity higher than those of materials forming the individual electrodes 30 and the common electrode 20.

The heat resistor 40 includes multiple heat portions 41. In the plan view of the main surface 11 of the substrate 10, the multiple heat portions 41 are individual portions of the heat resistor 40 sandwiched between the common electrode 20 (more specifically, the first strip portion 23) and the individual electrode 30 (more specifically, the first strip portion 33).

A common potential (for example, a ground potential) is applied to the common electrode 20. A potential is applied from the driver IC (not shown) to each of the multiple individual electrodes 30. Accordingly, a current flows through the individual electrode 30 to which a potential is applied, that is, the first strip portion 33 and its adjacent common electrode 20, namely, the heat portion 41 between the first strip portions 23, and the heat portion 41 accordingly generates heat. The heat from the heat portion 41 is transferred to a printing medium such as thermal paper, thereby performing printing on the printing medium.

The protection layer 45 covers the wiring layer 15, the heat resistor 40 and the glaze layer 12. The protection layer 45 protects the heat resistor 40 from wear, corrosion and oxidation. The glaze layer 45 is formed of an insulative material such as amorphous glass. The protection layer 45 is provided with an opening portion (not shown), and the pad 35 is exposed from the opening portion of the protection layer 45.

Figure 4:
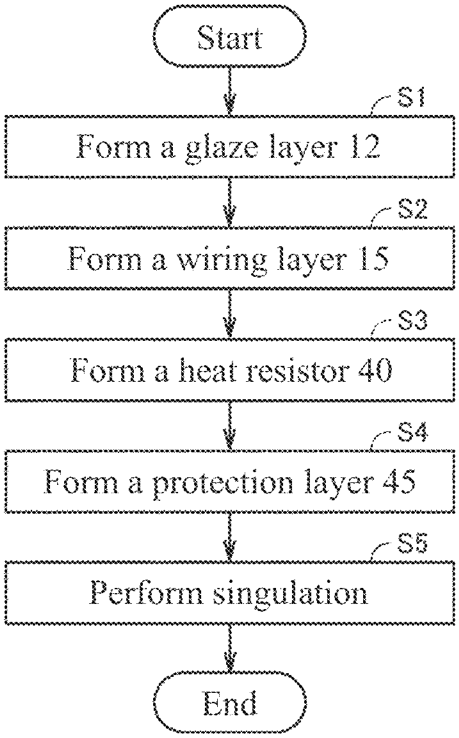
FIG. 4 is a flowchart of a method for manufacturing the thermal print head according to the first embodiment.

Referring to FIG. 4, the method for manufacturing the thermal print head 1 of this embodiment is described below.

A glaze layer 12 is formed on a main surface 11 of a substrate 10 (S1). More specifically, a slurry containing glass is applied onto the main surface 11 of the substrate 10 by means of such as screen printing. The slurry is dried and then calcined to form the glaze layer 12.

A wiring layer 15 is formed on the glaze layer 12 (S2). The wiring layer 15 includes a common electrode 20 and multiple individual electrodes 30. More specifically, a metal layer (not shown) is formed on the glaze layer 12. The metal layer is formed by, for example, a method as follows: A slurry containing a material constituting the metal layer, for example, a resinate slurry containing silver particles, is applied onto the glaze layer 12 using such as screen printing, and then the slurry is calcined. Next, by means of a photolithography step, the metal layer is patterned to form the wiring layer 15. For example, a resist pattern is formed on the metal layer. The resist pattern is formed by applying a photosensitive resin material on the metal layer, and exposing and developing the applied photosensitive resin material. The resist pattern includes an opening portion. The metal layer is exposed from the opening portion of the resist pattern. The resist pattern is used as a mask to etch the portion of the metal layer exposed from the resist pattern. Accordingly, the metal layer is patterned and becomes the wiring layer 15.

A heat resistor 40 is formed (S3). For example, a slurry containing a material (for example, glass or ruthenium oxide particles) forming the heat resistor 40 is applied onto the first strip portions 23 and 33 and the glaze layer 12. The slurry is then calcined. Accordingly, the heat resistor 40 is formed.

A protection layer 45 is formed (S4). For example, a slurry containing glass is applied onto the wiring layer 15, the heat resistor 40 and the glaze layer 12. The slurry is then calcined. Accordingly, the protection layer 45 is formed.

Singulation is performed on the laminated body including the substrate 10, the glaze layer 12, the wiring layer 15, the heat resistor 40 and the protection layer 45 (S5). For example, the laminated body is irradiated by laser to cut the laminated body. The laminated body is singulated into multiple thermal print heads 1. Accordingly, the thermal print head 1 is obtained.

A variation example of this embodiment is described below.

Figure 5:
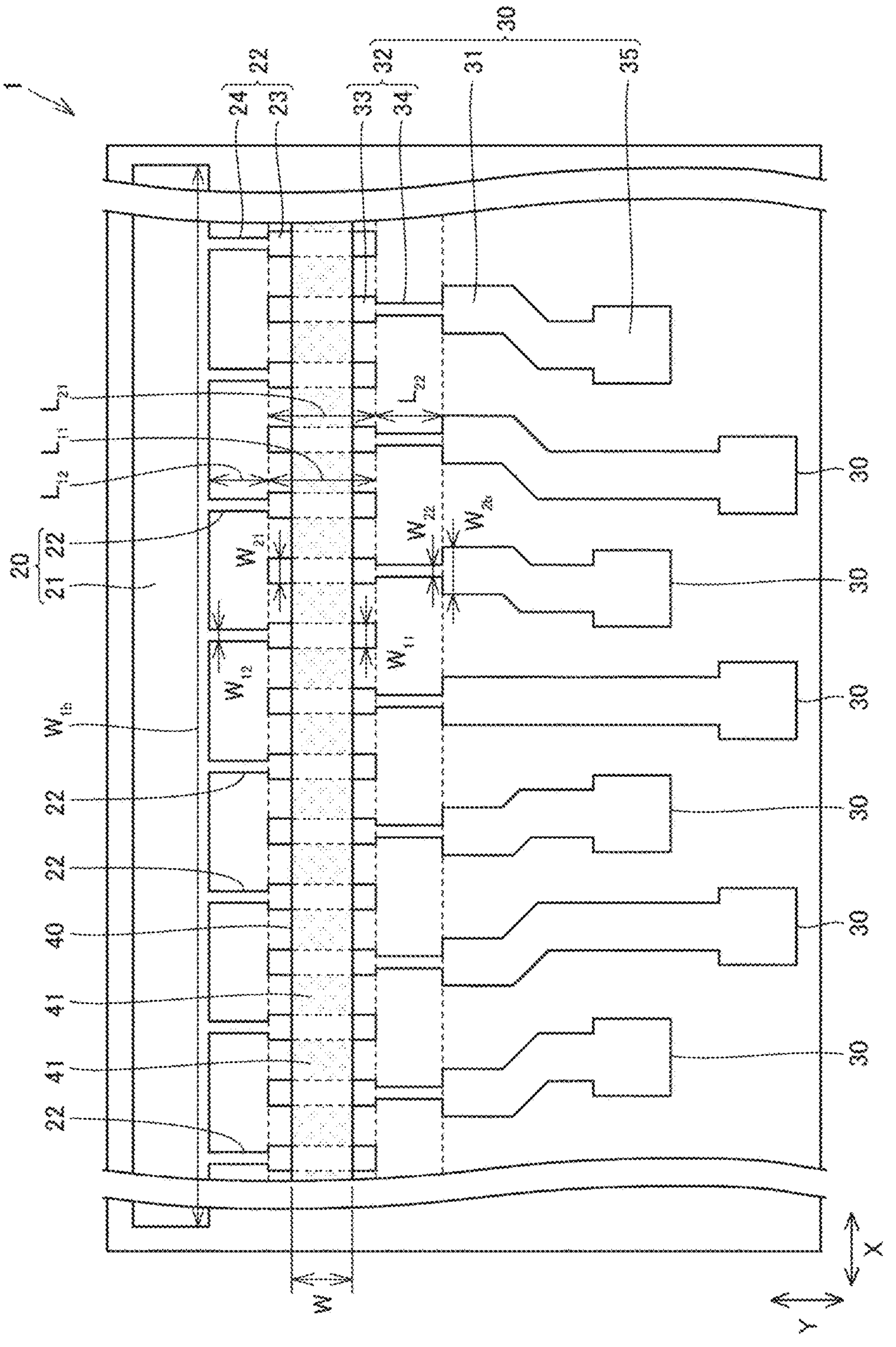
FIG. 5 is a schematic partial enlarged plan view of a thermal print head according to a variation example of the first embodiment.

Referring to FIG. 5, the width (for example, $W_{12}$) of at least a portion of the second strip portion 24 can also be less than the width $W_{11}$ of the first strip portion 23. The second strip portion 24 in its entirety has a certain width $W_{12}$ in the lengthwise direction of the extension portion 22, and the width $W_{12}$ of the second strip portion 24 in its entirety can also be less than the width $W_{11}$ of the first strip portion 23. The width (for example, $W_{22}$) of at least a portion of the second strip portion 34 can also be less than the width $W_{21}$ of the first strip portion 33. The second strip portion 34 in its entirety has a certain width $W_{22}$ in the lengthwise direction of the extension portion 32, and the width $W_{22}$ of the second strip portion 34 in its entirety can also be less than the width $W_{21}$ of the first strip portion 33.

Figure 6:
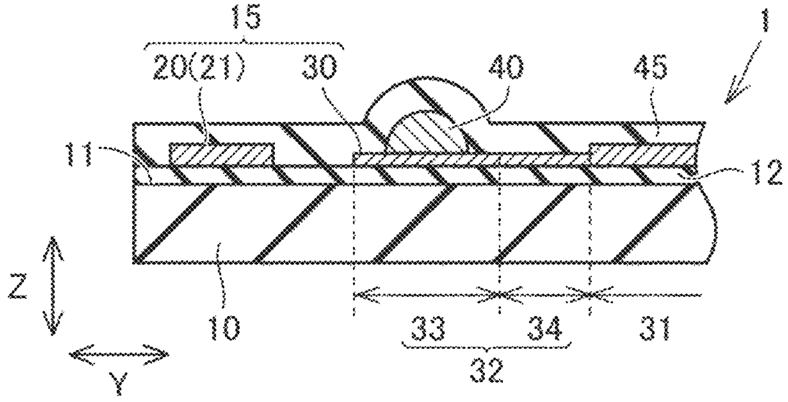
FIG. 6 is a schematic partial enlarged cross-sectional diagram of a thermal print head according to a variation example of the first embodiment.
Figure 7:
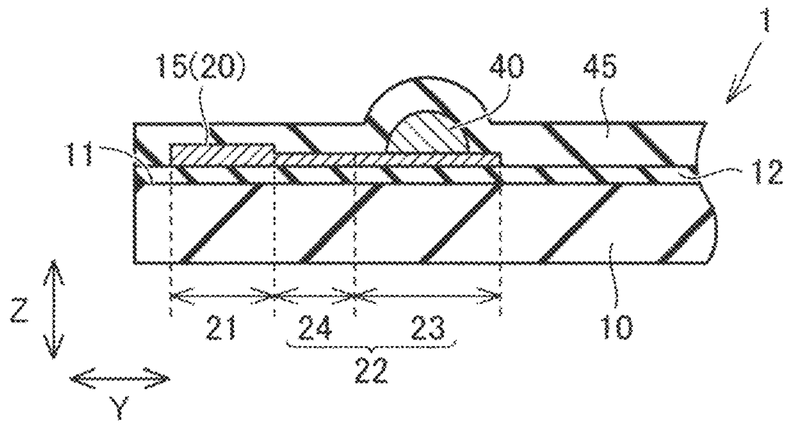
FIG. 7 is a schematic partial enlarged cross-sectional diagram of a thermal print head according to a variation example of the first embodiment.

Referring to FIG. 6, a thickness of the second strip portion 34 can also be less than a thickness of the base portion 31. Referring to FIG. 7, a thickness of the second strip portion 24 can also be less than a thickness of the base portion 21. The extension portions 22 and 32 can extend in a direction inclined with respect to the lengthwise direction of the heat resistor 40.

The effects of the thermal print head 1 of this embodiment are described below.

The thermal print head 1 of this embodiment includes: a heat resistor 40, including a heat portion 41; a first electrode (a common electrode 20 or an individual electrode 30), connected to the heat resistor 40; and a second electrode (the individual electrode 30 or the common electrode 20), connected to the heat resistor 40. The heat portion 41 is a portion of the heat resistor 40 sandwiched between the first electrode and the second electrode. The first electrode includes a base portion (a base portion 21 or a base portion 31), and an extension portion (an extension portion 22 or an extension portion 32) extending from the base portion to the heat resistor. The extension portion includes a first strip portion (a first strip portion 23 or a first strip portion 33), and a second strip portion (a second strip portion 24 or a second strip portion 34) connected to the first strip portion and the base portion. The first strip portion is in contact with the heat resistor 40 and overlaps the second electrode along a lengthwise direction of the heat resistor 40. The second strip portion does not overlap the second electrode along the lengthwise direction of the heat resistor 40. A first width ($W_{11}$ or $W_{21}$) of the first strip portion is less than a second width ($W_{1b}$ or $W_{2b}$) of the base portion at a conjunction between the second strip portion and the base portion. A third width ($W_{12}$ or $W_{22}$) of the second strip portion at the conjunction between the second strip portion and the base portion is less than the second width of the base portion. A width ($W_{12}$ or $W_{22}$) of at least a portion of the second strip portion is equal to or less than the first width. A length ($L_{12}$ or $L_{22}$) of the second strip portion is greater than a half of a difference between a length ($L_{11}$ or $L_{21}$) of the first strip portion and a width W of the heat resistor 40.

Thus, thermal resistance of the second strip portion (the second strip portion 24 or the second strip portion 34) is increased, and heat dissipated from the heat resistor 40 through the second strip portion to the base portion (the base portion 21 or the base portion 31) of the first electrode (the common electrode 20 or the individual electrode 30) is decreased. Energy needed for increasing the temperature of the heat resistor 40 to a target temperature is reduced. Thus, energy efficiency of the thermal print head 1 printing on a printing medium is improved.

The thermal print head 1 of this embodiment includes: a heat resistor 40, including a heat portion 41; a first electrode (a common electrode 20 or an individual electrode 30), connected to the heat resistor 40; and a second electrode (the individual electrode 30 or the common electrode 20), connected to the heat resistor 40. The heat portion 41 is a portion of the heat resistor 40 sandwiched between the first electrode and the second electrode. The first electrode includes a base portion (a base portion 21 or a base portion 31), and an extension portion (an extension portion 22 or an extension portion 32) extending from the base portion to the heat resistor 40. The extension portion includes a first strip portion (a first strip portion 23 or a first strip portion 33), and a second strip portion (a second strip portion 24 or a second strip portion 34) connected to the first strip portion and the base portion. The first strip portion is in contact with the heat resistor 40 and overlaps the second electrode along a lengthwise direction of the heat resistor 40. The second strip portion does not overlap the second electrode along the lengthwise direction of the heat resistor 40. A first width ($W_{11}$ or $W_{21}$) of the first strip portion is less than a second width ($W_{1b}$ or $W_{2b}$) of the base portion at a conjunction between the second strip portion and the base portion. A third width ($W_{12}$ or $W_{22}$) of the second strip portion at the conjunction between the second strip portion and the base portion is less than the second width. A width ($W_{12}$ or $W_{22}$) of at least a portion of the second strip portion is less than the first width.

Thus, thermal resistance of the second strip portion (the second strip portion 24 or the second strip portion 34) is increased, and heat dissipated from the heat resistor 40 through the second strip portion to the base portion (the base portion 21 or the base portion 31) of the first electrode (the common electrode 20 or the individual electrode 30) is decreased. Energy needed for increasing the temperature of the heat resistor 40 to a target temperature is reduced. Thus, energy efficiency of the thermal print head 1 printing on a printing medium is improved.

In the thermal print head 1 of this embodiment, a thickness of the second strip portion (the second strip portion 24 or the second strip portion 34) is less than a thickness of the base portion (the base portion 21 or the base portion 31).

Thus, thermal resistance of the second strip portion (the second strip portion 24 or the second strip portion 34) is further increased, and heat dissipated from the heat resistor 40 through the second strip portion to the base portion (the base portion 21 or the base portion 31) of the first electrode (the common electrode 20 or the individual electrode 30) is further decreased. Energy needed for increasing the temperature of the heat resistor 40 to a target temperature is reduced. Thus, energy efficiency of the thermal print head 1 printing on a printing medium is improved.

In the thermal print head 1 of this embodiment, the first electrode is the individual electrode 30 and the second electrode is the common electrode 20.

Thus, thermal resistance of the second strip portion 34 is further increased, and heat dissipated from the heat resistor 40 through the second strip portion 34 to the base portion 31 of the individual electrode 30 is further decreased. Energy needed for increasing the temperature of the heat resistor 40 to a target temperature is reduced. Thus, energy efficiency of the thermal print head 1 printing on a printing medium is improved.

In the thermal print head 1 of this embodiment, the first electrode is the common electrode 20 and the second electrode is the individual electrode 30.

Thus, thermal resistance of the second strip portion 24 is further increased, and heat dissipated from the heat resistor 40 through the second strip portion 24 to the base portion 21 of the common electrode 20 is further decreased. Energy needed for increasing the temperature of the heat resistor 40 to a target temperature is reduced. Thus, energy efficiency of the thermal print head 1 printing on a printing medium is improved.

Second Embodiment

Figure 8:
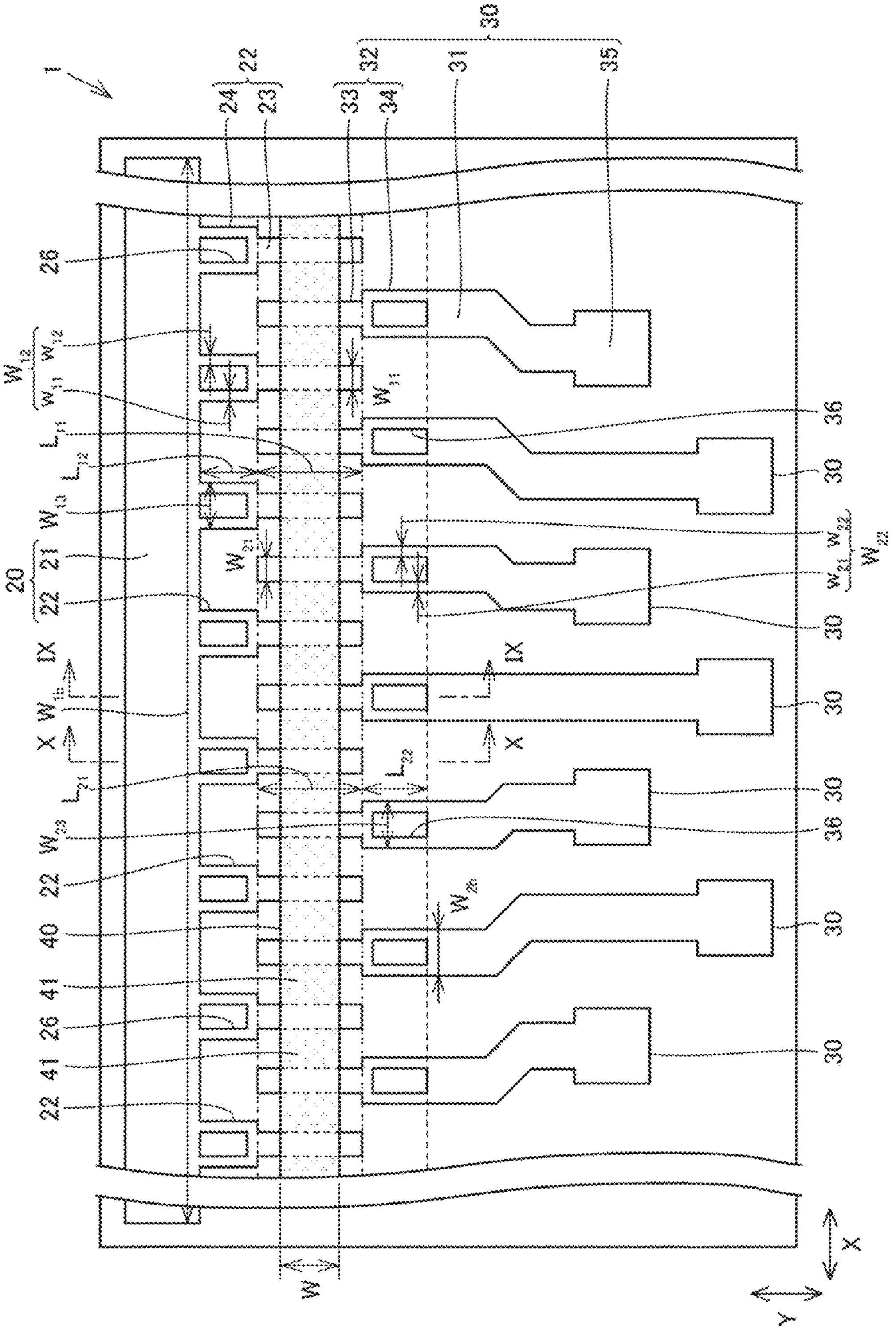
FIG. 8 is a schematic partial enlarged plan view of a thermal print head according to a second embodiment.
Figure 9:
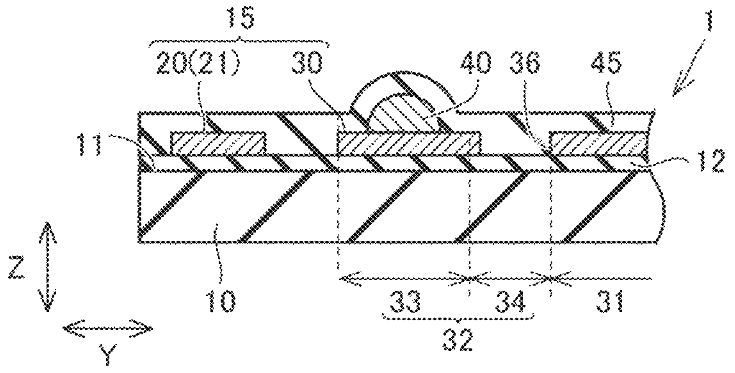
FIG. 9 is a schematic partial enlarged cross-sectional diagram of the thermal print head along the section line IX-IX in FIG. 8 according to the second embodiment.
Figure 10:
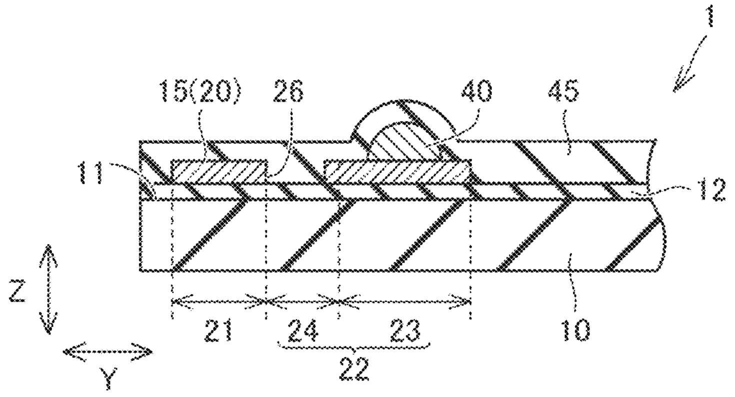
FIG. 10 is a schematic partial enlarged cross-sectional diagram of the thermal print head along the section line X-X in FIG. 8 according to the second embodiment.

Referring to FIG. 8 to FIG. 10, a thermal print head 1 according to a second embodiment is described below. The thermal print head 1 of this embodiment has a configuration similar to that of the thermal print head 1 of the first embodiment, and primarily differs from the thermal print head 1 of the first embodiment in the following.

A width $W_{13}$ of appearance of the second strip portion 24 of this embodiment is greater than a width of appearance of the second strip portion 24 of the first embodiment. In this embodiment, the width $W_{13}$ of the appearance of the second strip portion 24 is greater than the width $W_{11}$ of the first strip portion 23, and is less than the width $W_{1b}$ of the base portion 21 at the conjunction between the second strip portion 24 and the base portion 21.

An insulative region 26 is disposed inside the second strip portion 24. The insulative region 26 is a region in which the common electrode 20 is not formed. The insulative region 26 is formed by, for example, removing a portion of a metal layer in the step (S2) of forming the wiring layer 15 shown in FIG. 4. The insulative region 26 can extend to the conjunction between the second strip portion 24 and the base portion 21.

A width (for example, $W_{12}$) of a portion of the second strip portion 24 is less than the width $W_{1b}$ of the base portion 21 at the conjunction between the second strip portion 24 and the base portion 21, and is equal to or less than the width $W_{11}$ of the first strip portion 23. A width (for example, $W_{12}$) of a portion of the second strip portion 24 is determined by the sum of a width $w_{11}$ and a width $w_{12}$. The width $w_{11}$ is a width of a portion of the second strip portion 24 on one side in an arrangement direction (the X direction) of multiple extension portions 22 with respect to the insulative region 26. The width $w_{22}$ is a width of a portion of the second strip portion 24 on the other side in the arrangement direction (the X direction) of the multiple extension portions 22 with respect to the insulative region 26.

A width $W_{23}$ of appearance of the second strip portion 34 of this embodiment is greater than a width of appearance of the second strip portion 34 of the first embodiment. In this embodiment, the width $W_{23}$ of the appearance of the second strip portion 34 is greater than the width $W_{21}$ of the first strip portion 33, and is equal to the width $W_{2b}$ of the base portion 31 at the conjunction between the second strip portion 34 and the base portion 31.

An insulative region 36 is disposed inside the second strip portion 34. The insulative region 36 is a region in which the individual electrode 30 is not formed. The insulative region 36 is formed by, for example, removing a portion of a metal layer in the step (S2) of forming the wiring layer 15 shown in FIG. 4. The insulative region 36 can extend to the conjunction between the second strip portion 34 and the base portion 31.

A width (for example, $W_{22}$) of a portion of the second strip portion 34 is less than the width $W_{2b}$ of the base portion 31 at the conjunction between the second strip portion 34 and the base portion 31, and is equal to or less than the width $W_{21}$ of the first strip portion 33. A width (for example, $W_{22}$) of a portion of the second strip portion 34 is determined by the sum of a width $w_{21}$ and a width $w_{22}$. The width $w_{21}$ is a width of a portion of the second strip portion 34 on one side in an arrangement direction (the X direction) of multiple extension portions 32 with respect to the insulative region 36. The width $w_{22}$ is a width of a portion of the second strip portion 34 on the other side in the arrangement direction (the X direction) of the multiple extension portions 32 with respect to the insulative region 36.

The thermal print head 1 of this embodiment achieves effects below same as the thermal print head 1 of the first embodiment.

In the thermal print head 1 of this embodiment, an insulative region (the insulative region 26 or the insulative region 36) is disposed inside at least a portion of a second strip portion (the second strip portion 24 or the second strip portion 34).

Thus, thermal resistance of the second strip portion (the second strip portion 24 or the second strip portion 34) is increased, and heat dissipated from the heat resistor 40 through the second strip portion to the base portion (the base portion 21 or the base portion 31) of the first electrode (the common electrode 20 or the individual electrode 30) is decreased. Energy needed for increasing the temperature of the heat resistor 40 to a target temperature is reduced. Thus, energy efficiency of the thermal print head 1 printing on a printing medium is improved.

The invention claimed is:

1. A thermal print head, comprising:
a heat resistor, including a heat portion;
a first electrode, connected to the heat resistor; and
a second electrode, connected to the heat resistor, wherein
the heat portion is a portion of the heat resistor sandwiched between the first electrode and the second electrode,
the first electrode includes a base portion and an extension portion extending from the base portion to the heat resistor,
the extension portion includes a first strip portion and a second strip portion connected to the first strip portion and the base portion,
the first strip portion is in contact with the heat resistor and overlaps the second electrode along a lengthwise direction of the heat resistor,
the second strip portion does not overlap with the second electrode along the lengthwise direction of the heat resistor,
a first width of the first strip portion is less than a second width of the base portion at a conjunction between the second strip portion and the base portion,
a third width of the second strip portion at the conjunction is less than the second width,
a width of at least a portion of the second strip portion is equal to or less than the first width, and
a length of the second strip portion is greater than a half of a difference between a length of the first strip portion and a width of the heat resistor.

2. The thermal print head of claim 1, wherein an insulative region is disposed inside the at least the portion of the second strip portion.

3. The thermal print head of claim 2, wherein
the first electrode is an individual electrode, and
the second electrode is a common electrode.

4. The thermal print head of claim 2, wherein
the first electrode is a common electrode, and
the second electrode is an individual electrode.

5. The thermal print head of claim 1, wherein
the first electrode is an individual electrode, and
the second electrode is a common electrode.

6. The thermal print head of claim 1, wherein
the first electrode is a common electrode, and
the second electrode is an individual electrode.

7. A thermal print head, comprising:
a heat resistor, including a heat portion;
a first electrode, connected to the heat resistor; and
a second electrode, connected to the heat resistor, wherein
the heat portion is a portion of the heat resistor sandwiched between the first electrode and the second electrode,
the heat portion is a portion of the heat resistor sandwiched between the first electrode and the second electrode,
the first electrode includes a base portion and an extension portion extending from the base portion to the heat resistor,
the extension portion includes a first strip portion and a second strip portion connected to the first strip portion and the base portion,
the first strip portion is in contact with the heat resistor and overlaps the second electrode along a lengthwise direction of the heat resistor,
the second strip portion does not overlap with the second electrode along the lengthwise direction of the heat resistor,
a first width of the first strip portion is less than a second width of the base portion at a conjunction between the second strip portion and the base portion,
a third width of the second strip portion at the conjunction is less than the second width, and
a width of at least a portion of the second strip portion is less than the first width.

8. The thermal print head of claim 7, wherein an insulative region is disposed inside the at least the portion of the second strip portion.

9. The thermal print head of claim 8, wherein
the first electrode is an individual electrode, and
the second electrode is a common electrode.

10. The thermal print head of claim 8, wherein
the first electrode is a common electrode, and
the second electrode is an individual electrode.

11. The thermal print head of claim 7, wherein
the first electrode is an individual electrode, and
the second electrode is a common electrode.

12. The thermal print head of claim 7, wherein
the first electrode is a common electrode, and
the second electrode is an individual electrode.

* * * * *